July 23, 1963 W. E. PORTZ 3,098,313
REEL MOUNTING MEANS FOR FISHING RODS
Filed April 7, 1960 2 Sheets-Sheet 1
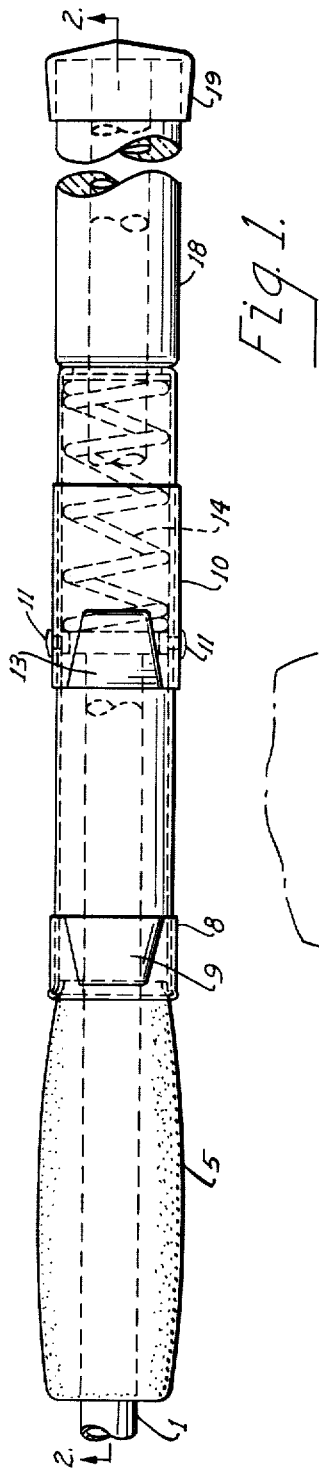
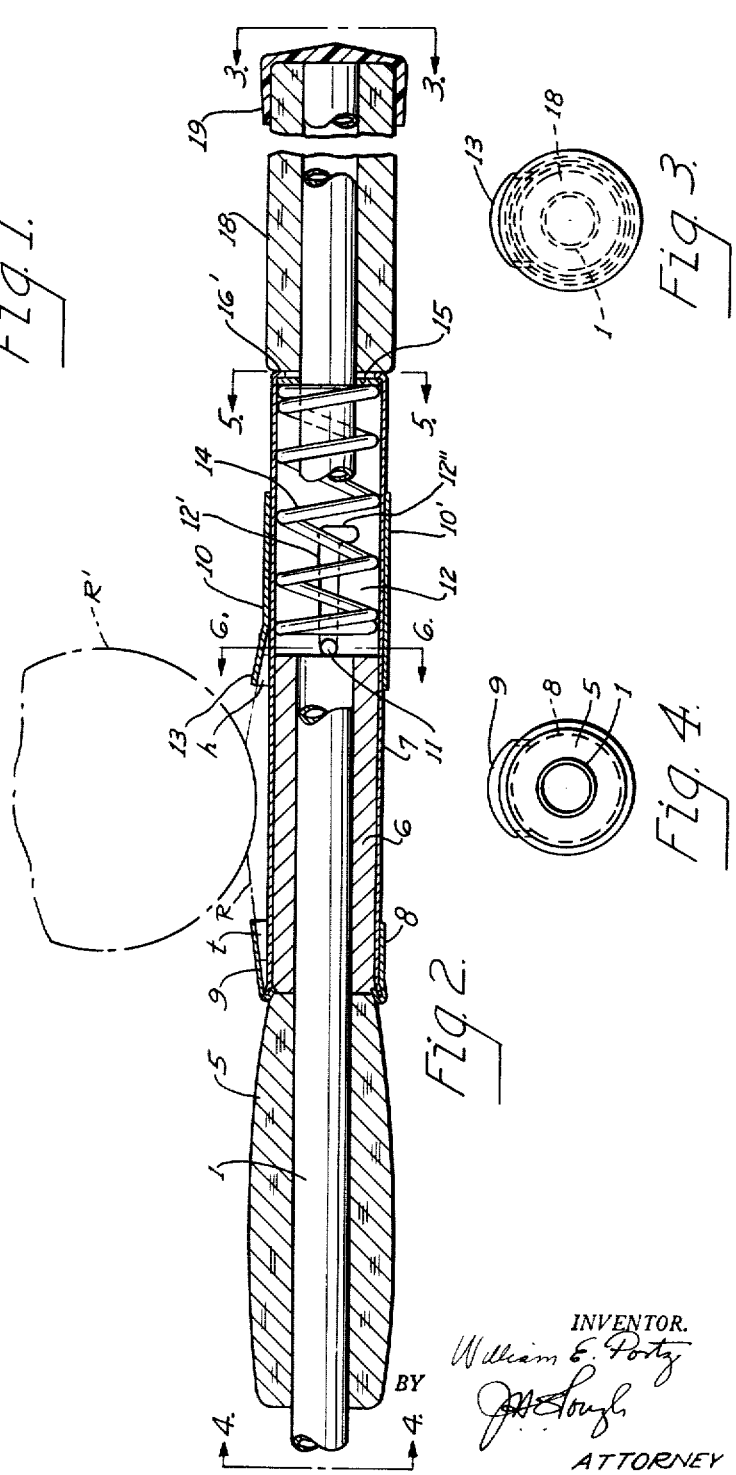
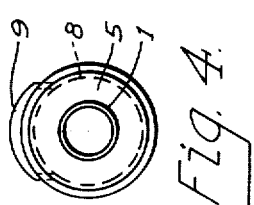
INVENTOR.
William E. Portz
BY
ATTORNEY July 23, 1963

W. E. PORTZ 3,098,313

REEL MOUNTING MEANS FOR FISHING RODS

Filed April 7, 1960

INVENTOR.
William E. Portz
BY
ATTORNEY

United States Patent Office 3,098,313
Patented July 23, 1963

3,098,313
REEL MOUNTING MEANS FOR FISHING RODS
William E. Portz, Geneva, Ohio, assignor to True Temper Corporation, Cleveland, Ohio, a corporation of Ohio
Filed Apr. 7, 1960, Ser. No. 20,696
3 Claims. (Cl. 43—22)

My invention relates to fishing rods and relates more particularly to improved means for securing a fishing reel thereto.

In certain prior art structures with which I am familiar the placement of a reel on a fishing rod handle, particuuarly on fly rods, spinning rods and trolling rods, involves threading one or more annular members over one or both ends of a reel base and a certain awkwardness in handling the rod results with frequent necessity of several attempts before securing a secure mounting of the reel on and/or ready detachment from the rod. Also, the presence of foreign material commonly interferes with the proper threading of the annular members or bands on the rod.

It is an object of my invention therefore to provide improved reel fastening means which can be quickly operated with a minimum of handling required during mounting on and/or removal of the reel from the rod.

Another object of my invention is to provide a definite location of a reel seat upon which reels of various sizes may be positioned and on which the reel may be securely mounted.

The objects of my invention and the invention itself will become more readily apparent after a consideration of the following detailed description and appended drawings, forming a part hereof, in which drawings:

FIG. 1 is a top plan view of an embodiment of my invention, certain parts being shown in dotted lines and others broken away for greater clarification;

FIG. 2 is a longitudinal sectional view of the modification of FIG. 1;

FIG. 3 is a section on the line 3—3 of FIG. 2;

FIG. 4 is a section on the line 4—4 of FIG. 2;

Figure 6:
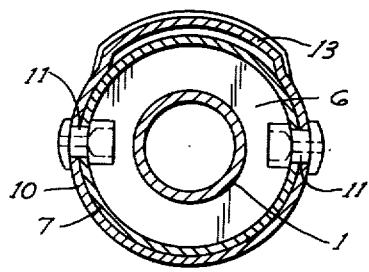
FIG. 6 is a sectional view taken from the line 6—6 of FIG. 2.
Figure 5:
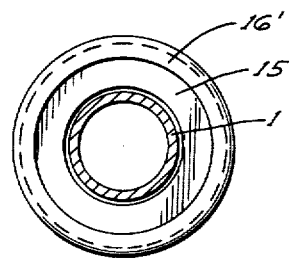
FIG. 5 is a sectional view taken from the line 5—5 of FIG. 2.
Figure 7:
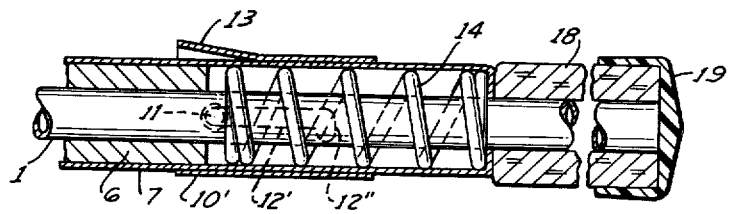
FIG. 7 is an enlarged view of the rear reel seat angaging means of my invention, the same being a modification thereof.

Referring now to the drawings, in all of which like parts are designated by like reference characters, at 1 is shown the butt end of preferably a spinning or trolling rod over which is fitted a preferably bored cork grip casing 5, and in alignment and contiguous therewith a tubular filler member 6, a sleeve 7 being preferably telescoped over the member 6 telescoped in turn over a portion of the butt end of the rod.

An annular metallic band or front cap member 8 is preferably secured, as best shown in FIG. 2, by interposing an inturned forwardly disposed peripheral edge thereof between the sleeve member 7 and the cork casing 5 and preferably over the forwardly disposed edge of the sleeve 7 and between the sleeve and filler member 6, as best shown in FIG. 2. The cap member 8 is preferably fixedly secured to the sleeve 7 by rivets or the like and is provided with an upstruck portion 9 forming a pocket for receiving the toe of a preferably conventional type reel base.

A similar annular band 10 is provided in longitudinally spaced relation to the cap member 8 and is telescoped over the sleeve 7, being rotatably mounted on the sleeve by means of pop rivets 11—11, best shown in FIG. 6, which are adapted to ride in a pair of generally L-shaped aligned slots or slideways 12—12 disposed on either side of the sleeve 7, each having its horizontally disposed longer leg 12' in spaced alignment and its relatively shorter leg 12" oppositely turned at right angles to the leg 12' and in reverse vertical direction as best shown in FIG. 2. The band 10 is provided similarly to the band 8 with an upstruck portion 13 which forms a pocket for receiving a heel portion of the reel base.

The filler 6 extends preferably from the cork grip portion 5 over a length of rod generally approximating the length of an average reel base. A compression coil spring 14 is preferably telescoped over the rod and abuts or seats at one end convolution against the pop rivets 11—11 and by an opposite end convolution either upon an apertured disc or washer 15, as in the form of FIGS. 1 to 6 inclusive, or upon an inturned edge 16 of the sleeve 7, as in the form of FIG. 7. In the form of my invention shown in FIG. 2, the inturned edge or flange 16' is preferably of less depth than in the form of FIG. 7 where the end of the tube is turned to form a seat for the spring and apertured to permit the rod to project therethrough. The rear or projecting end of the rod, in the forms of FIGS. 1 to 6 and FIG. 7, is preferably encased within a cork or like covering 18 and capped as shown by a cup-shaped end cover 19 of any preferred material, such as rubber, plastic, metal, etc.

The annular band 10 is preferably provided with a longitudinally extending substantially cylindrical body portion 10' of generally greater length than the pocket portion 13 and upon retraction thereof by manually exerted pull against the pressure of the spring 14 as the band is slidably moved in a rearward direction on the sleeve 7, the pop rivets 11 ride in the horizontal legs 12' of the slideway 12 to the rearmost end thereof and by rotation in one direction of the slidable and rotatable band 10 ride into the relatively shorter legs 12" thereof and the band is thus disposed and securely maintained rearwardly and in inoperative spaced relation to the reel seating means 8. The reel seat, indicated in broken lines in FIG. 2, is then seated upon the rod 1 by first placing the toe *t* of the reel base R into secure seating engagement within the pocket 9 of the band 8 and the heel *h* of the base is seated in similar fashion within the pocket 13 of the reel receiving means 10 by first rotating the band 10 in an opposite direction to that used in locking the band in its full retracted position, thus bringing the rivets 11 into alignment with the horizontal legs of the L-shaped slots; whence upon release of the band the spring means 14 will urge the band forward to a position in which the pocket 13 will snap over the heel *h* of the reel base R of the reel R' and spring pressure from the loaded spring 14 will maintain the reel in secure seating engagement with the sleeve 7 and reel seating means 8 and 10.

To detach a reel from such association with the rod, only sufficient rearward manual pull on the band 10 is required to permit withdrawal of the toe of the reel base from the pocket 9 of the band 8, although, as above described, the band is preferably rotated and locked in its rearmost position.

Figure 8:
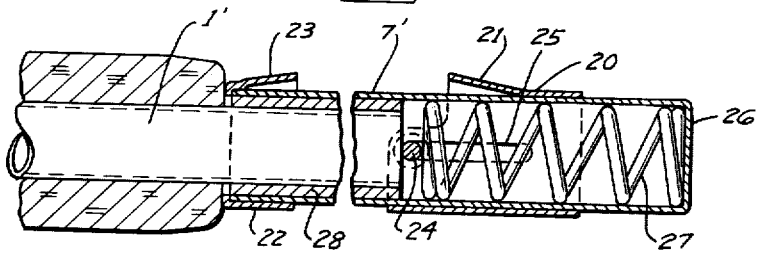
FIG. 8 is a longitudinal sectional view of a preferred form of my invention, certain portions being broken away for greater disclosure of the remaining parts.
Figure 9:
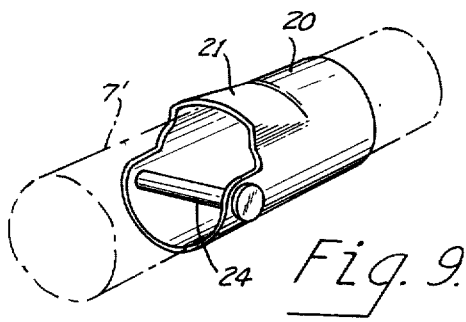
FIG. 9 is a perspective view of the more rearwardly disposed reel seat means of the form of my invention disclosed in FIG. 8.

In the form of my invention illustrated in FIGS. 8 and 9, only reciprocating sliding non-rotational movement of the preferably rearmost disposed band 20 is shown and utilized to withdraw the reel seating or pocket means 21 carried thereby from reel contact when the reel is in the process of being either removed from the fly rod shown therein or first placed in position upon the rod by disposing first, its toe portion *t* within the reel seating or pocket means 23 carried by the preferably forwardly disposed band 22; the band 20 being secured to the sleeve 7' in this form, by pin means 24 disposed through aligned apertures in the band 20 and through oppositely disposed aligned longitudinally extending slots 25—25 in the sleeve or tube 7'.

The sleeve or tube 7' in this embodiment, is provided with a flat end face 26 and one end convolution of the loaded compression spring 27 seats against such face and an opposite end convolution seats or bears against the pin 24. Filler means 28 similar to filler means 6 in the forms of my invention illustrated in FIGS. 1 to 7 inclusive, is preferably telescoped between the butt end to the rod 1 and the sleeve or tube 7'. The rod, however, terminates in the form of FIGS. 8 and 9 forwardly of and adjacent the pins means and the tube 7' projects rearwardly of the rod.

Although I have described my invention in connection with certain preferred embodiments thereof, I am however aware that numerous and extensive departures, as in inter-positioning of size, could be made, without however departing from the spirit of my invention and the scope of the appended claims.

What I claim is:

1. Real seat mounting means for detachably securing a reel to a fishing rod comprising a fishing rod, a first tubular member telescoped over said rod, filler means positioned between said tubular member and said rod along a substantial portion of the length of said first tubular member, said first member, rod and filler means constituting a rigid assembly, means secured at the forward end of said first tubular member for seating the toe of a reel base, a second tubular member telescopically and slidably mounted upon said first member and having an upstructure portion adapted to seat the heel of a reel base, means mounting said second member on said first member to facilitate relative reciprocal movement therebetween, and compression spring means telescoped over said rod and within said first tubular member, said spring abutting said mounting means at its forward end, and abutting an end portion of said first tubular member at its rearward end, rearward movement of said tubular member serving to further compress said spring and unseat the heel potion of said reel base, and wherein subsequent forward motion of said second tubular member, accomplished by releasing said compressed spring, moves said second tubular member so that the upstruck portion thereof seats the heel portion of said reel base.

2. A device for detachably mounting a reel seat upon a fishing rod having a sleeve member telescoped over said fishing rod and in fixed relation therewith, a portion of said sleeve member protruding rearwardly of its rod telescoping portion, said sleeve member terminating in a closed end, compression spring means telescoped within said rearwardly extending portion of said sleeve member, said spring means having one end in abutment with said closed end of said sleeve, reel seating means disposed adjacent a forward portion of said sleeve and in fixed engagement with said sleeve and adapted to seat an end of said reel seat, second reel seating means telescoped over said sleeve member and in aligned longitudinally spaced rearward position with respect to said first recited reel seating means, a pair of aligned oppositely disposed aligned slideways in said rearward portion of said sleeve member, securing means disposed through said rearward portion of said sleeve member and through said recited second reel seating means, said securing means being limited in its forward movement by the end of said rod, whereby said second reel seating means may be longitudinally reciprocably movable with respect to said first recited reel seating means, said spring having an end abutting said securing means and exerting spring pressure upon said second reel seating means.

3. Reel seat mounting means for detachably securing a reel to a fishing rod comprising a sleeve member telescoped over said rod, filler means positioned between said tubular member in said rod along a substantial portion of the length of said sleeve member, said sleeve member, rod, and filler means constituting a rigid assembly, coil spring means telescoped within said sleeve member, means secured at the forward end of said sleeve member for seating the toe of a reel base, a second reel seating member telescopically and slidably mounted upon said sleeve member and having an upstruck portion adapted to seat the heel of a reel base, said sleeve member having an end portion adapted to seat an end convolution of said spring means, said spring means being telescoped over said rod and said rod projecting within the sleeve member, the opposite end convolution of said spring means being in abutting contact with said slidable reel seating means, said sleeve member having a pair of generally L-shaped oppositely disposed slots therein, said slots each having a horizontally extending slot portion and a vertically extending slot portion, the vertically extending leg of one slot being disposed upwardly of its associated horizontally extending leg and the vertically extending leg of the oppositely disposed slot being disposed downwardly thereof, securing means projecting through said slots to secure said relatively slidable reel seating means upon said sleeve, manual effort upon said sleeve in a rearward direction positioning said slidable reel seating means and rotation of said reel seating means seating the securing means within the relatively vertically extending legs of said slots to securely lock the said slidable reel seating means out of contact with the reel base.

References Cited in the file of this patent

UNITED STATES PATENTS

| | | |
|---|---|---|
| 951,731 | Haskell | Mar. 8, 1910 |
| 1,711,248 | Powell | Apr. 30, 1929 |
| 2,145,612 | Scogland | Jan. 31, 1939 |
| 2,517,224 | Matson | Aug. 1, 1950 |

FOREIGN PATENTS

| | | |
|---|---|---|
| 248,947 | Great Britain | Mar. 18, 1926 |
| 101,930 | Sweden | Apr. 30, 1941 |

UNITED STATES PATENT OFFICE
CERTIFICATE OF CORRECTION

Patent No. 3,098,313    July 23, 1963

William E. Portz

It is hereby certified that error appears in the above numbered patent requiring correction and that the said Letters Patent should read as corrected below.

Column 3, line 25, for "Real" read -- Reel --; line 35, for "upstructure" read -- upstruck --; line 44, for "potion" read -- portion --.

Signed and sealed this 25th day of February 1964.

(SEAL)
Attest:
ERNEST W. SWIDER

Attesting Officer

EDWIN L. REYNOLDS

Acting Commissioner of Patents